Figure 1:
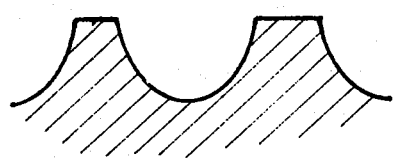

United States Patent [19]

Palmer et al.

[11] 4,149,187
[45] Apr. 10, 1979

[54] PRINTING PLATE INSPECTION APPARATUS

[75] Inventors: Archibald E. Palmer, Punchbowl; Raymond G. Macquart, Lugarno; Risto T. T. Karaiste, Tahmoor, all of Australia

[73] Assignee: John Fairfax & Sons Limited, New South Wales, Australia

[21] Appl. No.: 812,952

[22] Filed: Jul. 5, 1977

[30] Foreign Application Priority Data

Jul. 6, 1976 [AU] Australia .............................. PC6546

[51] Int. Cl.² .......................... H04N 7/18; G01B 5/28
[52] U.S. Cl. .................................... 358/106; 73/105; 358/107
[58] Field of Search ................. 356/109, 69; 358/106, 358/107; 73/105

[56] References Cited

U.S. PATENT DOCUMENTS

| | | | |
|---|---|---|---|
| 1,447,176 | 3/1923 | Henry | 356/69 |
| 2,474,015 | 6/1949 | Shaw | 73/105 |
| 3,715,476 | 2/1973 | Watanabe | 358/106 |
| 3,819,855 | 6/1974 | Rush | 358/94 |
| 3,908,079 | 9/1975 | Worthley | 356/109 |
| 3,922,093 | 11/1975 | Dandliker | 358/106 |

*Primary Examiner*—Howard W. Britton
*Attorney, Agent, or Firm*—Seidel, Gonda, Goldhammer & Panitch

[57] ABSTRACT

A printing plate inspection apparatus for inspecting the dot profile of photo-engraved printing plates having a length of opaque material having a straight edge which is placed adjacent the surface to be inspected with a light source to light the surface on one side of the straight edge, and a viewing device on the other side of the straight edge to receive the light reflected from the surface under the straight edge to determine the dot profile.

5 Claims, 5 Drawing Figures

PRINTING PLATE INSPECTION APPARATUS

This invention relates to the printing industry and is particularly concerned with inspection of the dot profile of photo-engraved printing plates.

Such printing plates are prepared by an acid etching process and are used extensively, inter alia, in the preparation of newspapers and the like. The surface of a photo-engraved printing plate, whether a half-tone or other such plate comprises a plurality of so-called dots protruding from the plate base, such dots remaining in the original plate surface after etching. These dots may be of the order of, for example, 65 to the inch. The surface of such a plate is inked by application thereto of an ink coated roller or the like. Clearly, where dots are wide and comparatively close, the surface of the plate will be more heavily inked and appear darker (assuming black ink to be applied to the entire surface) than areas where dots are narrow and spaced. Using a pattern of dots on a plate which dots vary in width and spacing over the plate surface the plate after inking will contain areas which appear black to the naked eye, areas which appear almost white, and areas of differing shades of grey.

It is of importance that consistency of shading is maintained in shaded areas and the delineation between areas of two different shades is sharp and clear. Factors which militate against achievement of these desirable objects concern the nature of the dots, or protruding portions of plate surface and the profile of the plate in portions thereof between dot surfaces.

Figure 2:
Figure 3:

FIGS. 1, 2 and 3 of the accompanying drawings illustrate three examples of possible dot profiles. In FIG. 1 the dot surfaces are flat and the profile of the region between dot surfaces is deep and sharply defined, falling away fairly steeply from the dot surfaces. This is the desired plate characteristic in that when ink is introduced to the surface it will be retained on the flat upper portion of the dots but will not run into the valley between the dots.

In FIG. 2 the region between the dots is undesirably shallow and the profile of this region adjacent the dot surfaces is not sufficiently sharply angled away from the dot surfaces. The result is that when the plate surface is inked, ink runs into the region between the dots and the plate is afforded a darker shading in this area than was required.

In FIG. 3 the indentation or undercutting marked 'a' is the result of eating into the under surface of the dot concerned by acid applied in the etching process. As this dot is subjected to pressure it is most likely that portion of the dot surface will crumble and the resultant shading in this region will be too light if insufficient dot surface is inked or too dark if the resultant profile of the area between dots after crumbling of the dot surface is such that ink will run into this region.

It is clear that before a half-tone or other photo-engraved printing plate is used for reproduction printing it should be examined closely to determine the acceptability of dot profiles on the plate. This has been done conventionally by use of a strong magnifying glass, but such technique is open to so many possible errors that it is wholly unacceptable in view of modern printing technology and requirements. A proposed possible solution to this problem of examination of the plate surface before use is by way of a very fine stylus. But such a stylus, although able to gauge the depths of valleys between dot surfaces, is totally unable to perceive difficulties such as those previously described with reference to FIG. 3 of the accompanying drawings.

Consequently it is an object of this invention to provide apparatus which allows inspection of the dot surface and profile of a photo-engraved plate, which apparatus is free of the deficiencies of prior art examination techniques.

This invention, in one broad form provides apparatus comprising a length of opaque material having a straight edge which is adapted to be placed adjacent the surface to be inspected, a light source adapted to light the surface on one side of the straight edge, and a viewing device disposed on the other side of the straight edge and adapted to receive source light reflected from the surface under the straight edge.

Figure 4:
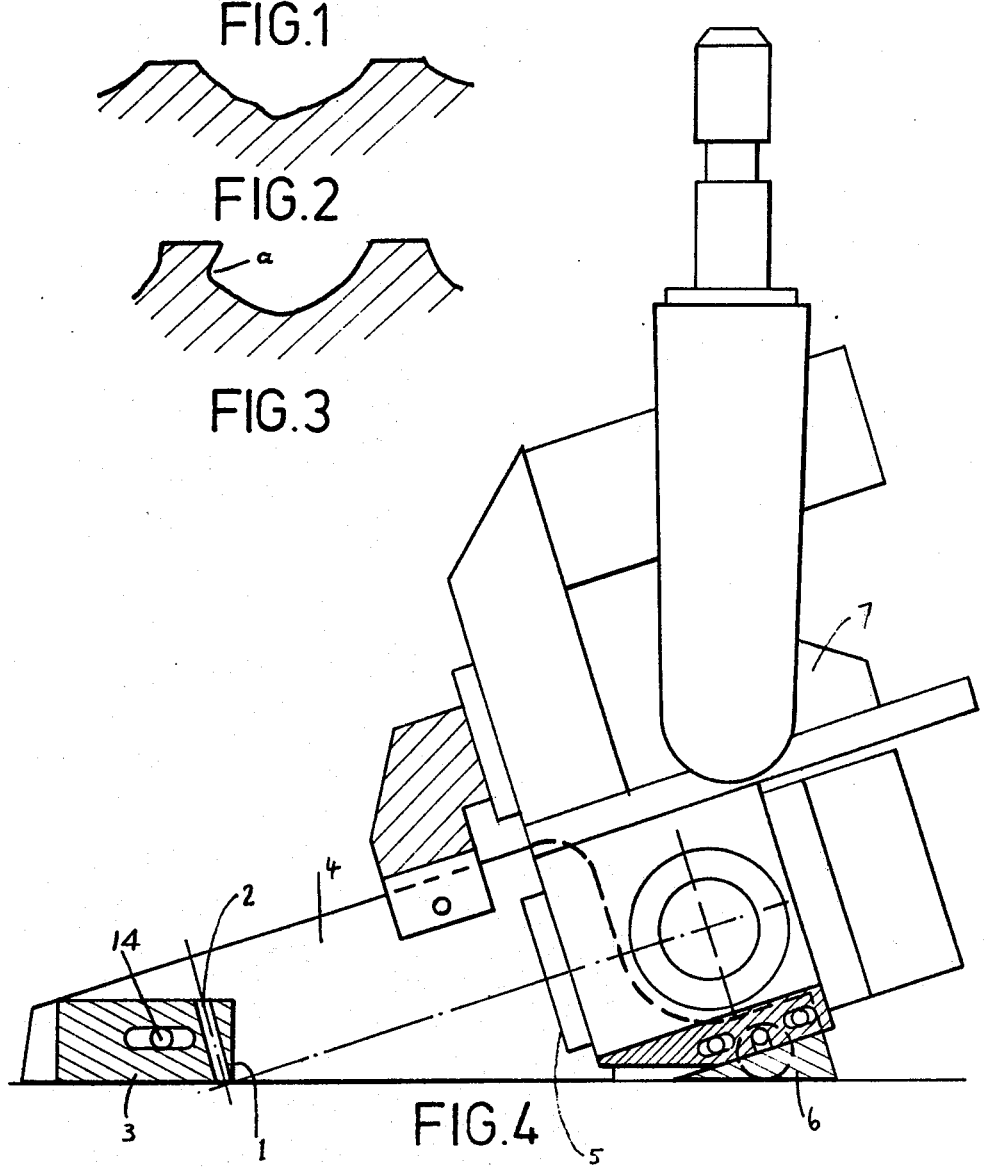
Figure 5:
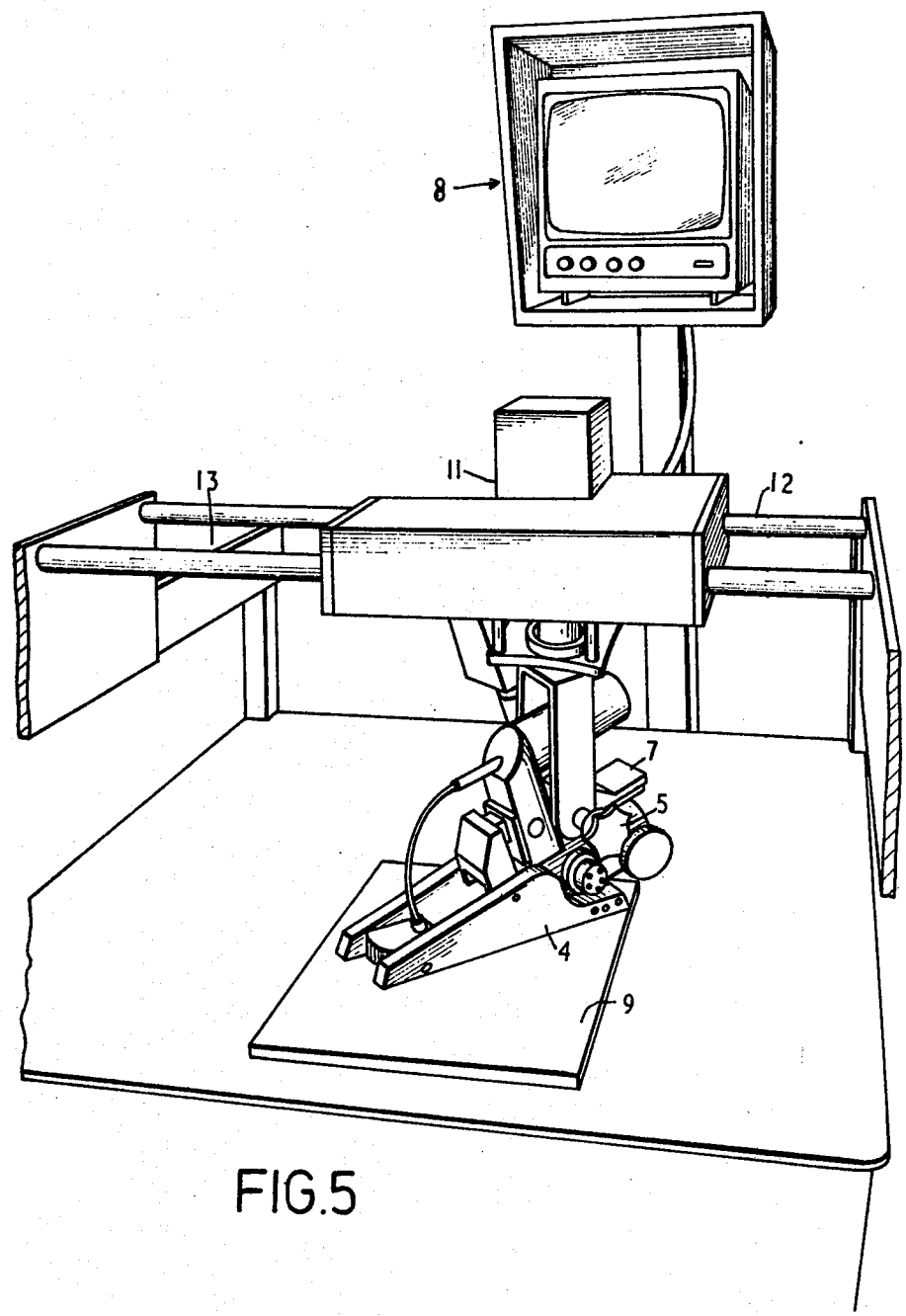

The invention will be now described by way of example with reference to the accompanying drawings in which:

FIG. 4 depicts a sectioned assembly of apparatus according to one embodiment of the invention; and FIG. 5 depicts a representation of the complete assembly of the embodiment described in FIG. 4 in use.

In FIG. 4 straight edge 1 is arranged so as to allow slight clearance between this straight edge and a portion of plate to be inspected. Light source in the nature of optical fibre 2 depicts light onto the plate surface to the left (as seen in FIG. 4) of the straight edge. In this embodiment straight edge 1 is incorporated as an end member of rotatable housing 3 through which light source 2 is directed. Housing 3 is rotatable about pin 14. Shoe 4 is preferably of nylon which is a comparatively heat resistant material which may scan the surface of a photographic plate without damaging the same. The sole 6 of this shoe 4 is adapted for rotation and supports microscope unit 5 the output of which is transmitted through portion 7 of the apparatus to a viewing screen such as a television screen shown in FIG. 5.

The preferred form of the invention is shown in FIG. 5 wherein the viewing device comprises a microscope 5 to which is attached a video camera 7. The image of the portion of surface inspected can be then directed to appear on a television monitor 8.

Placement of a graduated transparent screen against the monitor screen allows depth of etch or width of dot face to be measured accurately, although satisfactory examination of the plate surface can usually be effected by viewing the image thereof on the monitor screen with the naked eye.

In this embodiment the microscope 5, opaque straight edge 1, light source 2 and video camera 7 are built into a unit in such a manner that the components are maintained in correct optical relationship to each other at all times. The unit of this embodiment is designed to sit firmly on the surface of the plate 9 being inspected. The arrangement of the apparatus is such that the focal point of the optical system is located on the surface being inspected beneath the straight edge.

The microscope unit is mounted on a carriage 11 in a manner which allows the microscope unit to be moved vertically to or from the plate surface. The carriage is mounted on horizontal rails 12 which permit lateral movement of the carriage and microscope unit. The preferred magnification is 120:1.

The lateral rails are mounted at each end on carriages 13 which run on transverse rails. This assembly of rails and carriages allows the microscope unit to be moved in any direction.

Vertical movement of the microscope unit is also allowed for, as for example, by rotation of a lever disposed in the region above the microscope itself.

The rails and bed plate are carried by a steel frame, the lower section of which may be enclosed to provide a cabinet part of which is used to house video equipment.

What we claim is:

1. Printing plate inspection apparatus comprising a length of opaque material having a straight edge which is adapted to be placed adjacent the surface to be inspected, a light source adapted to light the surface on one side of the straight edge, and a viewing device disposed on the side of the straight edge and adapted to receive source light reflected from the surface under the straight edge.

2. Apparatus according to claim 1 wherein said viewing device comprises a microscope whose focal point is located on the surface being inspected beneath the straight edge.

3. Apparatus according to claim 1 wherein said viewing device is connected to a video camera so that the image of the portion of the surface inspected can then be directed to appear on a television monitor.

4. Apparatus in accordance with claim 2 wherein said viewing device is connected to a video camera so that the image of the portion of the surface inspected can then be directed to appear on a television monitor.

5. Apparatus in accordance with claim 1 wherein said viewing device comprises a microscope whose focal point is located on the surface being inspected beneath the straight edge, said viewing device being connected to a video camera so that the image of the portion of the surface inspected can then be directed to appear on a television monitor, means supporting said viewing device for horizontal and vertical movement.

* * * * *